US008529667B2

(12) United States Patent  (10) Patent No.: US 8,529,667 B2
Thundyil et al.  (45) Date of Patent: *Sep. 10, 2013

(54) METHOD FOR THE SELECTIVE EXTRACTION OF ACIDS, BASES AND POLAR SALTS

(76) Inventors: Matt Thundyil, The Woodlands, TX (US); Carl Hahn, Sugar Land, TX (US); Doug Mittlesteadt, Saline, MI (US); Heath Burns, The Woodlands, TX (US); Martin Miller, The Woodlands, TX (US)

( * ) Notice: Subject to any disclaimer, the term of this patent is extended or adjusted under 35 U.S.C. 154(b) by 1003 days.

This patent is subject to a terminal disclaimer.

(21) Appl. No.: 11/706,565

(22) Filed: Feb. 16, 2007

(65) Prior Publication Data

US 2007/0186771 A1  Aug. 16, 2007

Related U.S. Application Data

(63) Continuation-in-part of application No. 10/995,843, filed on Nov. 22, 2004, now Pat. No. 7,604,685.

(51) Int. Cl.
*B01D 47/00* (2006.01)

(52) U.S. Cl.
USPC ............... 95/206; 95/211; 95/230; 95/237; 210/800

(58) Field of Classification Search
USPC ............... 95/210, 211, 214, 230, 237, 206; 210/639, 800
See application file for complete search history.

(56) References Cited

U.S. PATENT DOCUMENTS

| | | | | |
|---|---|---|---|---|
| 2,947,383 | A * | 8/1960 | Schytil et al. | 95/268 |
| 2,954,272 | A * | 9/1960 | Schaufelberger | 423/352 |
| 2,968,730 | A * | 1/1961 | Morris et al. | 250/375 |
| 3,556,716 | A * | 1/1971 | Pollio et al. | 423/227 |
| 3,773,471 | A * | 11/1973 | Macey | 422/202 |
| 5,017,350 | A * | 5/1991 | Hakka et al. | 423/242.7 |
| 5,122,169 | A * | 6/1992 | Schumacher et al. | 96/242 |
| 5,605,748 | A * | 2/1997 | Kennedy et al. | 55/486 |
| 5,750,024 | A * | 5/1998 | Spearman | 210/315 |
| 5,948,146 | A * | 9/1999 | Thomaides et al. | 95/273 |
| 6,803,025 | B2 * | 10/2004 | Meserole et al. | 423/243.08 |
| 6,849,105 | B2 * | 2/2005 | Baudry et al. | 95/94 |
| 2003/0228246 | A1 * | 12/2003 | Hammer et al. | 423/235 |

FOREIGN PATENT DOCUMENTS

WO  WO 02/056988 A2 *  7/2002
WO  WO 02/056988 A2 *  7/2002

* cited by examiner

*Primary Examiner* — Robert A Hopkins
(74) *Attorney, Agent, or Firm* — Thomas A. O'Rourke; Bodner & O'Rourke, LLP

(57) ABSTRACT

A process for the extraction of an unwanted material from a gas or liquid comprising the steps of introducing an extraction liquid into the fluid having an unwanted liquid therein to form a physical microdispersion comprising a plurality of extraction liquid droplets and the fluid, allowing the plurality of extraction liquid droplets to interact with the unwanted component in the fluid, to cause the extraction liquid droplets to be "wetted out" and captured on a porous medium, where the liquid is further contacted by the gas and simultaneously formed into a plurality of coalesceable droplets, coalescing the coalesceable droplets into larger droplets containing the unwanted liquid, and separating the larger droplets containing the unwanted liquid from the fluid.

36 Claims, 5 Drawing Sheets

Figure 1:
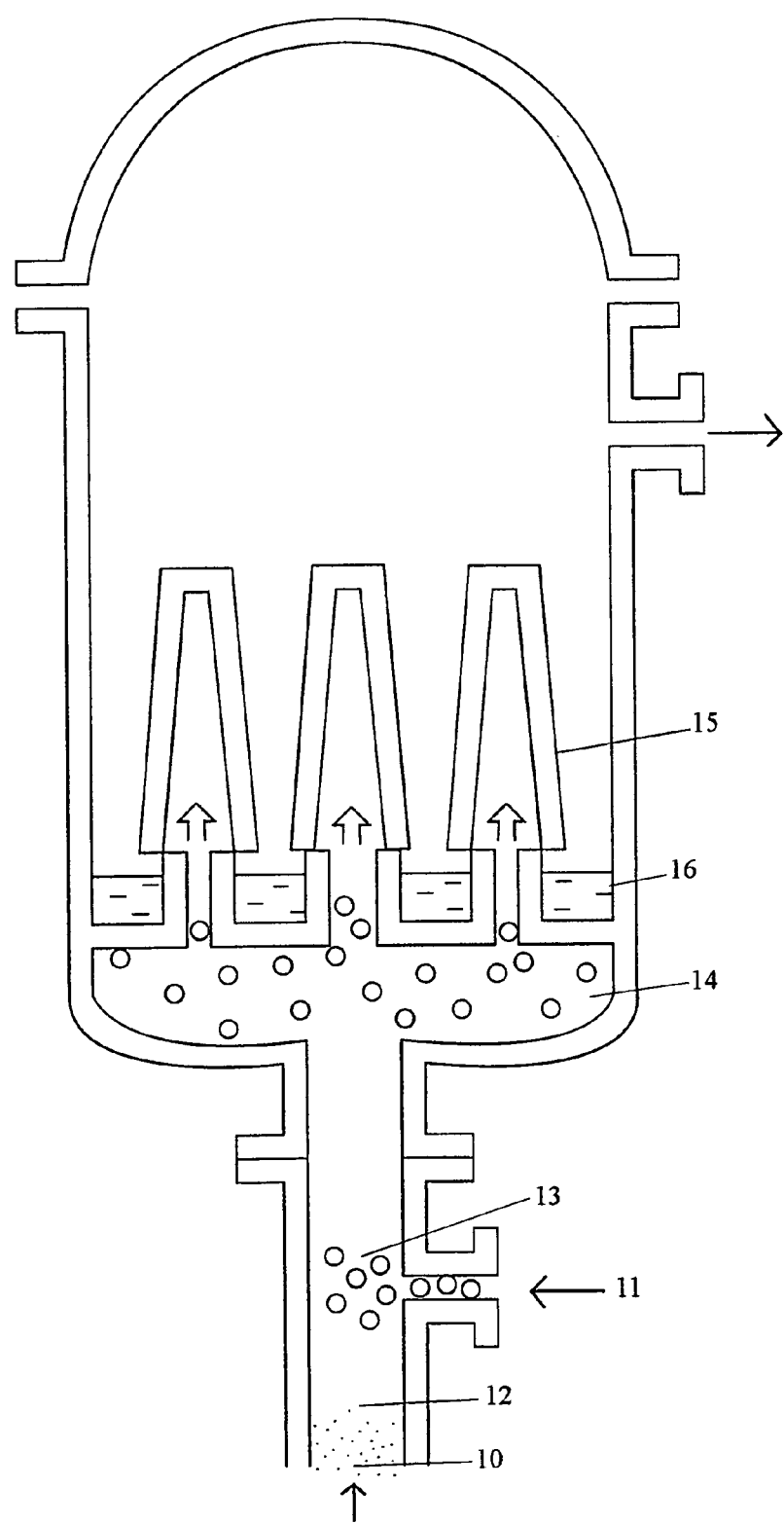

Scanning Electron Micrograph of MicroForm™
media: $\beta_2 - 5{,}000$
500X magnification

METHOD FOR THE SELECTIVE EXTRACTION OF ACIDS, BASES AND POLAR SALTS

CROSS REFERENCE TO RELATED APPLICATIONS

This is a continuation in part of U.S. application Ser. No. 10/995,843 filed on Nov. 22, 2004, which is now U.S. Pat. No. 7,604,685, the disclosures of which are incorporated herein by reference.

FIELD OF THE INVENTION

The present invention relates generally to the removal of undesired vaporized materials from a gas, or undesired dissolved components from a liquid and more particularly to a process for the selective removal of soluble acids, bases, polar salts from a gas or liquid or of heavier hydrocarbon removal from a gas stream.

STATEMENT REGARDING FEDERALLY SPONSORED RESEARCH OR DEVELOPMENT

None

REFERENCE TO A MICROFICHE APPENDIX

None

BACKGROUND OF THE INVENTION

Acids and bases are used in a number of different processes in the refining, chemical, petrochemical, and pharmaceutical industries among others. Acids, bases, and salts may also be formed from syntheses, as reaction byproducts. It is often desired to eliminate these acids, bases or salts from the gas or liquid (or fluid) stream of interest. Elimination of the acid, base or salts from the fluid is traditionally accomplished by means of a scrubbing process, where a scrubbing liquid which is a separate phase from the fluid of interest is added, the scrubbing process may involve neutralization if an acid or base is involved. For example, a base in the form of a liquid is added to the fluid to neutralize the acids, and an acid in the form of a liquid is added to the fluid to neutralize the bases. If salts are present, water is used to scrub the salts out of the stream. Typically, an excess of the scrubbing component must be added to assure complete removal of acid, base or salt. The neutralization of the acid or base by the neutralizer results in salt byproducts being formed. Following the neutralization process, the excess neutralizer and salt byproducts must be removed.

Since the scrubbing liquid is a separate phase from the fluid of interest, the scrubbing is generally accomplished in columns where the scrubbing liquid is dispersed into the fluid of interest to facilitate the extraction. Depending on densities, one of the fluids will rise and the other will descend. For example, if the fluid of interest was a gas, gas bubbles rise up the column, contacting the liquid neutralizer. The excess neutralizer and reaction byproducts are subsequently removed at the bottom of the column. If the fluid of interest was a light hydrocarbon (specific gravity of 0.5), and the scrubbing fluid was water (specific gravity of 1.0), the water would be added on top and would descend down the column, whereas the hydrocarbon would be added at the bottom and would rise up the column. The efficacy of this system is related to the mass transfer efficiency between the two phases. This is directly related to the specific contact area (area per unit volume) that is available for mass transfer. To increase this area, many columns will typically use either structured or unstructured packing. The limited specific contact area possible necessitates increasing the size of the packing. The fluid stream, exiting the column will typically entrain with it, an aerosol or emulsion of the scrubbing liquid that may cause challenges downstream. Therefore, it becomes necessary to introduce high-efficiency aerosol-removal, or emulsion separation downstream. Typically, then, the mass transfer between the scrubbing liquid and the fluid of interest, and the complete separation of these fluids occur in two separate devices.

A disadvantage of the above conventional two-stage scrubbing process is associated with the capital costs for the hardware such as towers and reaction tanks.

Similarly, in the refining and other industries, gaseous hydrocarbon streams that contain a range of hydrocarbons are stripped of the heavier hydrocarbon components through absorption into absorption oil in an absorber column or an absorber stripped column.

The present invention provides a process for the removal of an unwanted component from a gas or liquid by introducing an extracting liquid to extract the unwanted component from this gas or liquid through an interaction between the extracting liquid and the unwanted component. In a preferred embodiment, the volume of extracting liquid can be generally the same as the volume of the component to be extracted. More specifically, this invention relates to the process of creating an aerosol or emulsion of an extractive liquid, capturing this aerosol or liquid on a high specific area microstructure to effect the extraction of the unwanted component and separation of the liquid phase within this microstructure. The extraction occurs from the fluid of interest to a scrubbing liquid phase that is either stably dispersed in the primary phase gas or a film on the porous medium. In the case of the removal of an acid, base or salts from a gas or liquid stream, the process involves creating an aerosol or emulsion or dispersion of a polar scrubbing liquid phase that is stably dispersed in the gas or liquid stream and forms a film on the porous medium. In the case of removing heavier hydrocarbons, the process involves creating an aerosol or dispersion of an extractive liquid that oleophilically interacts with the heavy hydrocarbons in the gas to form a "rich" oil phase that is stably dispersed in the light hydrocarbon gas stream and forms a film on the porous medium.

This stable dispersion, may be defined as a stable suspension of a discontinuous liquid phase within another continuous gas or liquid phase that is not separable by conventional gas/liquid separation technologies—such as filter-coalescers, residence time coalescers with mesh-pads or vane-packs, or filter separators, coalescing beds etc. For such stability, the discontinuous liquid phase consists of droplets in the 0.1-1-micron range for dispersion within the gas phase, with the larger droplet end of the spectrum possibly extending up to 10-micron range, and of droplets in the 0.1-10 micron range for dispersion in a continuous liquid phase with the larger droplet end of the spectrum possibly extending up to 100 microns. This stable dispersion is necessary to facilitate the first stage of the intimate mass-transfer between the primary and secondary phases. Following the dispersion, the second stage of the invention relates to then using a coalescer such as a porous medium to capture, coalesce, and separate the rich liquid in the form of droplets from the continuous gas or liquid. The film of rich liquid on the high surface area porous medium provides a secondary stage for extraction. In order for the porous medium to capture the droplets it must be constituted with fibers that are of such dimensions and interfacial properties as to be able to be "wetted-out" by the liquid, thus enabling it to capture these droplets. This typically requires the fibers to be of the order of magnitude of the droplets; in other words, the porous medium must consist of fibers that are at least in the 0.5-2-micron range. This invention then provides for the contact and separation of the extracting medium in a single device. A feature of the present invention is that the droplets to be created are a microdispersion, more specifically a "stable microemulsion" or a "stable aerosol". More specifically, this microdispersion has been described as having droplets smaller than 10-micron, preferably smaller than 3-micron in size if we are dealing with liquids dispersed in liquids; and as having droplets preferably smaller than 1-micron if we are dealing with liquid droplets in a gas stream. There is a distinct difference between a dispersion and a microdispersion to those skilled in the art. Both dispersions and microdispersions (or aerosols or emulsions) consist of a liquid phases distributed within another fluid. A dispersion is understood by those skilled in the art to consist of droplets that are large enough to be separable by residence time, whereas an emulsion consists of droplets that are small enough to be stable for extended periods of time (at least >1 day). A dispersion can be separated by conventional filter-coalescers, residence time coalescers with mesh-pads or vane-packs (such as Bayley's Great Britain Patent No. 1,443,704 "perforate packing" of "knitted mesh fabric"). There are a number of reasons for this, one of which is that larger droplets have lower surface energy, making them energetically predisposed to coalesce into even larger droplets. A second reason is that droplets larger than the boundary layer on the coalescing surface, tend to inertially impact this surface, and given their predisposition to droplet coalescence, once they impact this surface these droplets are likely to coalesce into larger droplets. As the droplets get smaller, their surface energies increase, making them less energetically disposed to coalescence. Simultaneously, as the droplets approach the dimensions of the boundary layer, they tend to not inertially impact the fixed surface, but to flow around it with the fluid streamline. The combination of these factors makes the coalescence of droplets non-linearly more difficult as the droplet size declines.

Additionally, efficiency of extraction is a function of the specific surface area (surface area per unit volume). Table 1 below illustrates specific surface area as a function of droplet size. It is known to those skilled in the art that the higher the specific surface area, the greater the efficiency of separation. Table 1 also illustrates the typical settling time required as a function of droplet size for a specified system. The system described below has a very large specific gravity difference (hydrocarbon 0.4 g/cm$^3$; and water 1.0 g/cm$^3$, difference in specific gravity is 0.6 g/cm$^3$) and the residence time, by Stokes' Law, is minimized compared to the systems with 0.01 g/cm$^3$ difference discussed in the invention. Even in a system that should be easily separable, droplets smaller than 10 micron will take extremely long times to settle out. As the specific gravity difference diminishes, this settling time will linearly increase—for example, the same droplet will take twice as long to settle in a dispersion with specific gravity difference of 0.2 g/cm$^3$ as it will in a dispersion with a specific gravity difference of 0.4 g/cm$^3$.

TABLE 1

Estimated Specific Surface Area and Separation Requirements

| Droplet Size (micron) | Specific Surface Area (m$^2$/m$^3$) | Residence Time For Separation |
|---|---|---|
| 500 | 600 | 115 seconds |
| 250 | 1200 | 65 seconds |
| 100 | 3000 | 7 minutes |
| 10 | 30,000 | 10 hours |
| 1 | 300,000 | 45 days |

System consists of 5% water in a hydrocarbon stream with a specific gravity of 0.4 g/cm3 and a viscosity of 1 cP.

DESCRIPTION OF THE PRIOR ART

The content of utilizing fibers for providing a high surface area contactor for extraction in the liquid phase has been described by Clonts in U.S. Pat. No. 3,992,156 "Mass Transfer Apparatus" and U.S. Pat. No. 3,977,829 "Liquid-Liquid mass transfer apparatus." The concept of using droplets to extract a vapor constituent from a gas, followed by the use of a mesh-pad to recover the rich liquid has been described by Bloomer in U.S. Pat. No. 4,397,662 "Apparatus for removing solvents from air". Schumacher and others extended this concept to using a mesh pad for absorption in U.S. Pat. No. 5,122,169 "Chemical recovery scrubbing system".

Fisher, in U.S. Pat. No. 6,136,282 for "Method for removal of hydrogen sulfide from gaseous streams" relates to a method for the use of a high surface area contactor, onto which droplets are sprayed, with the subsequent removal of the scavenging agent.

Breman, et al., in U.S. Pat. No. 6,413,429 for "Process and Apparatus for Liquid-Liquid Extraction," relates to the use of hydrophobic beads for the purposes of extracting non-polar components from an aqueous phase and accomplish extraction and separation in three separate stages annotated as centrifugal pump, coalescer and phase separator.

Bayley, in Great Britain 1,443,704 for "Method and Apparatus for Solvent Extraction of Liquid/Liquid Mixtures" relates to a method of extracting droplets larger than 100 microns from a liquid/liquid mixture through the use of a second liquid that is miscible with one of the components of the mixture, and which does not require diffusion of the liquid component.

Marsden, et al., in U.S. Pat. No. 2,469,883 for "Preparation of Methyl Silicone Elastomers," concerns the separation of an extant liquid/liquid mixture of acid and a silicone by contacting the silicone into a mixture of a nonpolar solvent such as toluene and an aqueous component.

Baranowski, in U.S. Pat. No. 3,561,193 for "Process for the Purification of Oils and the Like," relates to the use of a filter-coalescer to separate the free water in an unstable water-transformer oil mixture that may be comprised of silicones.

Kobayashi, et al., in U.S. Pat. No. 5,206,330 for "Method for the Preparation of Organopolysiloxane Free from Acid Catalyst Residue," concerns the reactive hydrolysis of an acid catalyst followed by water adition to a silicon-acid dispersion, which essentially relies on the coalescence of the admixed water with the acid. In all of the known examples in the literature, the mechanism of extraction and complete separation of the extracted phase does not teach or suggest a one-step process which extracts small droplets (<10 micron) of a soluble material, uses diffusion from the primary phase into the extracting fluid phase, forms a stable physical emulsion comprising polar liquid droplets, and employs a hydrophilic interaction to form a plurality of water-acid or water-base droplets in the silicone fluid stream.

For example, Clonts relates to the use of fibers for extraction of one component from a liquid into another liquid. Clonts mentions the use of fibers for the purposes of forming a film of liquid enabling contact with the bulk fluid stream to provide for mass transfer. However, the mechanism of separation of the extracting fluid is that of a "separator approximate the downstream end of the fibers and then separately removing the two liquids from the separator". Clonts does not teach or suggest the use of fibers for the extraction of a component into a liquid from gas, and requires a separate separation stage.

Bloomer is directed to the use of an apparatus where the absorption liquid is sprayed over a plurality of mesh-pads which are arranged sequentially in the direction of gas flow. The necessity of a multiplicity of mesh-pads is related to the inability of the mesh-pads to effectively accomplish the necessary mass transfer in a single stage, and inability to effectively remove all the absorption liquid in a single stage. This patent does not teach or suggest the use of a method that effects contact and separation in a single stage.

Schumacher and others relate to a scrubbing system where the liquid is sprayed through the gas stream for absorption on a demister screen. Schumacher explicitly provides for final removal of droplets with "candle filters of hydrophobic fibrous material". Patent '169 does not teach or suggest the use of a method that effects contact and separation in a single stage.

Fisher et al concerns the use of the wetted surface area of contactor surfaces including closely packed parallel plates, knitted meshes, parallel banks of small diameter tubes, types of structured packing similar to those used in mist eliminators etc. However, the method of Fisher requires that the "byproducts thus formed are removed from the natural gas streams by conventional means." This patent does not teach or suggest the use of a method that effects contact and separation in a single stage.

Breman, et al., relates to the use of hydrophobic beads for the purpose of extracting non-polar components from an aqueous phase. This patent does not teach or suggest the use a hydrophobic interaction to extract the desired materials. Breman also relates to the use of three separate stages annotated as centrifugal pump, coalescer and phase separator. The instant invention accomplishes extraction and separation in a single stage.

Bayley demonstrates extraction with droplets larger than 100 micron, but does not anticipate or suggest extraction with droplets less than 10 micron, because they would be substantially more difficult to separate, is concerned with extraction from a liquid-liquid mixture and does not require diffusion of the liquid component to be recovered into the solvent. Bayley's invention does not teach or suggest extraction of droplets smaller than 100 micron, or extraction of an insoluble material from a mixture or a process which does not require diffusion. Most critically, Bayley demonstrating extraction with droplets larger than 100 micron (Page 5, Column 2, Line 84-87) does not anticipate extraction with droplets of less than 10-micron, for the reason that the 10-micron and smaller droplets are substantially more difficult to separate, and therefore would not be considered separable. The advantage of superior extraction efficiency would be significantly, and fatally, undermined by the inability to separate the two phases from each other. Bayley, does not teach or suggest the use of microdispersed emulsion at all. In fact, Bayley makes reference to haze formation as an unwanted side effect (Page 5, Column 2, Lines 88-105) suggesting that this "secondary dispersion" can be coalesced to 100-micron droplets without suggesting what the droplet size that can be coalesced is. Clearly, Bayley does not anticipate the use of microdispersed droplets that are primarily smaller than 10-micron in his invention.

In addition, Bayley visualizes extraction from a liquid-liquid mixture through the use of a second liquid that is miscible with one of the components of the primary liquid-liquid mixture. This is not the same as extracting a dissolved component from a continuous primary phase into a secondary phase. For efficient extraction to occur in the first case, it is merely sufficient for the extracting fluid to come into even partial contact with the droplets in the primary mixture. By virtue of surface energies the droplets in this primary liquid-liquid mixture will coalesce into the larger extracting phase ("like attracts like"). On the other hand, if extraction is to be obtained of a dissolved species, it is necessary for that species to diffuse from the primary phase into the extracting fluid phase. Diffusionary mass transfer is extremely slow compared to hydraulic flow, and accordingly, to accomplish diffusionary mass transfer, it is necessary to have extremely high specific surface area (surface area to volume ratio). This high specific surface area can be accomplished by creating extremely small droplets as described in the present invention. However, merely enabling mass transfer into the extracting phase is not sufficient, if it is not possible to separate the two phases from each other. Accordingly, it is necessary to be able to create and separate the droplets from the two liquid phases effectively, and it is this combination that is novel. It is respectfully submitted that Bayley does not teach or suggest the creation of a plurality of microdispersed droplets for the. purpose of separation—Bayley relates to the use of large droplets for extraction. Secondly, Bayley does not teach or suggest the extraction of a dissolved component into the extracting liquid, Bayley merely discloses the coalescence of the "solvent" with that portion of the liquid/liquid mixture that it is miscible with. For efficient extraction to occur in the first case, it is merely sufficient for the extracting fluid to come into even partial contact with the droplets in the primary mixture. By virtue of surface energies the droplets in this primary liquid-liquid mixture will coalesce into the larger extracting phase ("like attracts like"). On the other hand, if extraction is to be obtained of a dissolved species, it is necessary for that species to diffuse from the primary phase into the extracting fluid phase. Diffusionary mass transfer is extremely slow compared to hydraulic flow, and accordingly, to accomplish diffusionary mass transfer, it is necessary to have extremely high specific surface area (surface area to volume ratio). This high specific surface area can be accomplished by creating extremely small droplets as described in the present invention. However, merely enabling mass transfer into the extracting phase is not sufficient, if it is not possible to separate the two phases from each other. Accordingly, it is necessary to be able to create and separate the droplets from the two liquid phases effectively, and it is this combination that is novel.

A polar interaction between the extraction liquid droplets and the unwanted liquid in the present invention is different from an intimate contact between Bayley et al.'s solvent and the liquid to be recovered in Bayley et al.'s liquid/liquid mixture. The intimate contact described by Bayley does not require diffusion of the liquid component to be recovered into the solvent, merely requiring the coalescence of the droplets of Bayley's solvent with the droplets of the liquid component to be recovered. Additionally, the large droplets of the kind described by Bayley are sufficient to accomplish the coalescence required for the desired separation of a liquid/liquid mixture; but such large droplets will not efficiently accomplish the separation of a dissolved component, and that to accomplish the extractive separation of such a dissolved component, it is necessary to utilize extremely small droplets that are not anticipated by, nor necessary for, Bayley's system. Marsden, et al., relates to the separation of an extant liquid/liquid mixture. Marsden does not relate to the extraction from a liquid/liquid mixture already extant.

Baranowski relates to the use of a filter-coalescer to separate free water from transformer oil that may be comprised of silicones. Baranowski does not teach a process whereby an unstable emulsion is created and diffusionary extraction is unnecessary.

Kobayashi, et al., concerns a process which relies on the coalescence of admixed water with an acid catalyst in order to achieve removal. Kobayashi does not teach a process of coalescence without the employment of a diffusion.

The combination of the references of Bayley et al, Marsden et al., Baranowski and Kobayashi et al. does not make the invention obvious as a review of the references of Bayley et al, Marsden et al., Baranowski and Kobayashi et al. reveals that the references of Bayley et al, Marsden et al., Baranowski and Kobayashi et al. each do not teach or suggest a polar interaction to form a plurality of liquid droplets, neither do they require the creation of a stable emulsion of extracting fluid within a single liquid phase for the purposes of extracting a soluble component. Specifically, Bayley teaches the use of a solvent to separate an extant liquid/liquid mixture, whereas the present invention teaches the extraction of the acid from a solution; Marsden et al. teach the separation of an extant liquid/liquid mixture of acid and a silicone by contacting the silicone into a mixture of a nonpolar solvent such as toluene and an aqueous component (Column 5, Lines 5-7), or by passing water over an insoluble silicone gum while milling it (Column 5, Lines 50-52); and Kobayashi et al., teach the reactive hydrolysis of the acid catalyst followed by water addition to a silicone-acid dispersion, which essentially relies on the coalescence of the admixed water with the acid similar to Bayley's separation. Baranowski (Column 3, lines 30-35) teaches the use of a filter-coalescer to separate the free water from a transformer oil that may be comprised of silicones. Baranowski does not teach or suggest the introduction of an extracting water phase, its dispersion into a stable form for the purpose of diffusionary extraction of unwanted soluble contaminants from the silicone through polar interaction between the extracting solvent and the unwanted soluble components. Most critically, Baranowski does not teach or suggest the separation of a stable emulsion of water through the use of a filter-coalescer, in fact, the necessity to utilize a vacuum degasifier that removes water implies the inherent inability of the filter-coalescer to remove the stable emulsion of water within the transformer oil. The inability of filter-coalescers to separate stable emulsions is well known to those skilled in the art; and is reinforced by Baranowski's vacuum dehydration invention. Clearly, then Baranowski does not anticipate the introduction of an extracting solvent, the creation of a stable emulsion, nor the effective separation of such a solvent without the use of a vacuum degasifier (which inherently requires the extracting solvent to be less volatile than the fluid to be purified). Further, the references of listed above including Bayley et al, Marsden et al., Baranowski et al, Kobayashi et al., and Breman et al., it is respectfully submitted that each of the processes of references work properly for its intended purposes. In view of the aforementioned, there is no motivation for a person of ordinary skill in the field of the invention to combine the references to facilitate the extractive separation of the instant invention

SUMMARY OF THE INVENTION

The present invention provides a process, preferably in a single stage, for the extraction of an unwanted component, such as an acid, base or soluble, polar salt, from a gas or liquid (fluid of interest) through the introduction of a relatively small volume of a liquid, such as water. The liquid would be introduced into the fluid of interest in the form of a stable dispersion of droplets (in the 0.1 to 10 micron range, if the fluid was a gas, preferably smaller than 1 micron; and 0.1 to 100 micron if the fluid was a liquid, preferably smaller than 3-micron), followed by the subsequent wetting out, capture, and removal of the liquid on a microstructured separator. Another example would be the extraction of heavy hydrocarbons from a light hydrocarbon stream, through the introduction of a volume of hydrocarbon oil such as kerosene into the gas stream. The introduction of such an absorbent or stripping fluid should be in the form of a spray. The droplet size of the spray should be selected to keep the droplets entrained in the fluid stream and not settle out by gravitational forces. This droplet size would typically be in the range of 0-300 micron depending on gas velocity, preferably less than 20 micron, and even more preferably in the 0.1-5-micron range for dispersion. An example of a stable, dispersion is one that does not readily gravitationally settle, and one that is not readily separable by conventional filter coalescers or filter separators. By forming such fine droplets; one can form a stable microdispersion with the droplets dispersed throughout the fluid. The size of the droplets is such that they cannot be separated from the fluid by conventional means. Because the plurality of such fine droplets and the component to be removed in the fluid attract each other through a physical or chemical interaction they form a plurality of droplets containing one or more components to be removed, which are smaller than the droplets which may be separated by conventional gas/liquid coalescers including mesh pads, vane-packs, residence time separators, and filter-coalescers. This stable microdispersion may be defined as a stable suspension of a discontinuous liquid phase within a continuous fluid phase, wherein the discontinuous liquid phase consists of droplets in the 0.1-1 micron range, with the larger droplet end of the spectrum possibly extending up to the 10-micron range if the fluid is a gas, and droplets in the 0.1-3 micron range, with the larger droplet end of the spectrum possibly extending up to 100-microns if the fluid is a liquid, and is not separable by conventional separation technologies—such as filter-coalescers, residence time coalescers with mesh-pads or vane-packs etc. This stable microdispersion is necessary to facilitate the specific surface area necessary to facilitate the intimate mass-transfer between the primary and secondary phases, in the microstructured extractor described below.

The preferred embodiment is to deliver the spray to the inlet of each individual contactor element thereby controlling even fluid and liquid flow distribution to the packing. Another possibility is to introduce the extraction liquid into the main fluid stream at a single point, or at multiple points in the form of droplets that are in the preferred size range so that they remained entrained in the gas stream. This would typically be droplets less than 20-micron in size, and preferably, less than 5-micron in size.

The fluid containing the droplets is then directed to a "micro" structured packing. Typical structured packing, or random packing that is used preferably has a maximum specific surface area of 1000 m2/m3. The “micro” structured packing has a specific surface area >2,000 m2/m3, typically in the 5,000-10,000 m2/m3 range. This high surface area provides for stage efficiencies of >95% and even >99%. This level of stage efficiency allows for co-current extraction processes (rather than multi-stage extraction contactors). The details of an example of a micro structured packing is shown in Table 2.

TABLE 2

| | | | | |
|---|---|---|---|---|
| Fiber Diameter | 0.5 | micron | 0 | m |
| Fiber Length | 1 | cm | 0.01 | m |
| Packing Density | 5% | | | |
| Single Fiber A/V | 4000000 | m2/m3 | | |
| Fiber Matrix A/V | 200000 | m2/m3 | | |
| Element Dia | 5.5 | in | 0.14 | m |
| Element Length | 36 | in | 0.91 | m |
| Element Volume | 0.01 | m3 | | |
| Media Area | 14 | ft2 | 1.3 | m2 |
| Media Thickness | 0.02 | in | 0 | m |
| Media Volume | 0 | m3 | | |
| Surface Area | 132.15 | m2 | | |
| MicroStructure Area | 9428.29 | m2/m3 | 3000-10000 | m2/m3 |

The preferred microstructured extractor of the present invention is a porous medium that has the capability to capture and grow these droplets. In order for the porous medium to capture the droplets it should be constituted with fibers that are of such dimensions as to be “wetted out” by the droplets and able to capture these droplets. This typically requires the fibers to be of the order of magnitude of the droplets, in other words, the porous medium must have fibers that are preferably at least in the 0.5-2 micron range. Materials may be selected so as to have affinity for the extraction fluid, that is, the fibers may be selected such that the interfacial surface tension between the fibers and the extraction liquid are low enough to allow the extraction liquid to “wet out” on the fibers. The droplets, which are coalesced on the fibers of the coalescing device to form larger polar droplets, can be gravitationally separated from the fluid. Once gravitationally separated, the larger droplets may then be removed from the fluid by, for example, a liquid level control valve. The liquid may be water, a base or a buffer solution in the case of a separation of an acid from a fluid stream. In the case of a separation of a base from a fluid stream, the liquid may be water, an acid or a buffer solution. Additionally, the liquid may be water, an acid, a base or a buffer solution in the case of a separation of a soluble, polar salt. Finally, in the case of a separation of a heavy hydrocarbon vapor from a light hydrocarbon or hydrogen gas, the liquid may be an hydrocarbon oil such as kerosene. The microstructured packing may be in any form. However, a cylinder or hollow conical configuration is preferred to allow co-current flow of the extraction liquid through the packing while allowing for ease of separation of the extraction liquid on the downstream side of the packing. The conical or cylindrical units would have one open end-cap and one closed end-cap. The open end-cap is in communication with the gas to be treated. Multiple units may be used inside of a vessel, etc.

The extraction liquid is dispersed in the gas stream within the contactor element and flow through the element with the gas. The microstructured extractor, then, acts to provide the necessary mass-transfer area, while simultaneously removing the aerosolized extracting liquid from the gas phase. The liquid droplets are captured by the fibers in the micro-structured packing, wet out the surface of the fibers where they form a dynamic ultra surface area for gas/liquid contact. This allows for high mass transfer of the undesirable gas components from the gas phase to the extraction liquid. As additional lean extraction liquid is continuously delivered to the upstream side of the packing, the liquid within the packing flows through the packing and emerges on the downstream side. The rich extracting liquid is gravitationally separated and drained away from the fluid stream on the outside of the contactor element.

BRIEF DESCRIPTION OF THE DRAWINGS

FIG. 1 shows a simplified sectional view of an apparatus for introducing a polar liquid into a gas containing a component to be removed;

FIG. 2 shows a close-up view of the porous medium illustrating the mechanism of microstructured extraction of FIG. 1; and FIG. 3 shows a close-up view of the porous medium of FIG. 1; and FIG. 4 is a schematic of a process whereby heavy hydrocarbons are being removed from a gas stream with an extracting oil, and the extracting oil being subsequently regenerated.

FIG. 5 is a schematic of a process whereby the extraction system is utilized.

DESCRIPTION OF THE PREFERRED EMBODIMENT

In general the present invention provides a process for the extraction of an unwanted component from a gas. In the preferred method it provides a process for the extraction of an acid, base or soluble, polar salt from a fluid through the introduction of a relatively small volume of a liquid such as water into the fluid as a stable microdispersion. This dispersion can comprise of a plurality of water-acid, water-base, or water-salt droplets. Where the material to be extracted is an acid, a water-based dispersion may be used.

Where the material to be extracted is a base, a water-acid dispersion may be used instead. Where a polar salt is to be extracted, a water dispersion can be used. Then, using a microstructured extractor such as a porous medium to be wetted out and to capture the droplets, thereby increasing the specific surface area for contact, the process then coalesces the droplets into separable size for extraction of the material to be extracted in the form of the droplets. The fluid from which the acid, base or soluble, polar salt is being extracted is preferably but not limited to gases or liquids that are not very soluble in water including hydrocarbons, air, or hydrogen. The acid(s) that can be extracted from the gas by the present process include but are not limited to hydrochloric acid. The base(s) that can be extracted from the gas by the present process include but are not limited to sodium hydroxide. Polar salts that can be extracted include but are not limited to sodium chloride. Another preferred application involves the extraction of heavy hydrocarbon vapors from a light hydrocarbon, hydrogen or air stream through an aerosolized extracting fluid such as kerosene. Another preferred application involves the extraction of oxygen from a gas stream using an oxygen scavenging liquid.

FIG. 1 shows a simplified sectional view of an apparatus for introducing an extracting liquid into a fluid 10 containing a vaporized or dissolved component to be removed 12. As shown in FIG. 1, the vaporized or dissolved component to be removed 12 is uniformly dispersed throughout the fluid 10. In the process of extracting the component 12 from fluid 10, a substantially immiscible or nonvolatilized volume of an extraction liquid such as water 11 is introduced into the fluid 10 containing the component 12. Since the component 12 in the fluid 10 has a much greater affinity for the extraction liquid 11 than for the fluid 10, the component 12 will move away from fluid 10 and move towards the extraction liquid 11. To further speed up the movement of the component 12 towards the water, the extraction liquid 11 introduced into the fluid 10 is formed into a plurality of microdispersed droplets 13 which are then dispersed throughout fluid 10 thereby creating a stable physical emulsion. The extraction fluid 11 is formed into the stable microdispersion of droplets 13 by various means such as but not limited to injection nozzles, mixing, pressurizing, or agitating the fluid 10. The stable microdispersion of droplets 13 formed are sufficiently small so that the droplets 13 cannot be effectively separated by conventional residence-time devices such as mesh-pads, vane-packs, conventional "filter-separators," conventional extraction columns with structured or random packing. Although the droplets may be larger in size, the present method preferably utilizes droplets having diameters ranging from 1-microns to sub-micron levels if the fluid 10 is a gas, or 10-microns and lower if the fluid 10 is a liquid. The dispersal of the aerosolized droplets 13 through out the fluid 10 speeds up the movement of the component 12 to the extracting fluid 11 since the distance that the component 12 has to travel to reach and interact with the water (i.e., stable microdispersion of droplets 13) is greatly. reduced. Once the material to be extracted reaches the stable microdispersion droplets 13, due to the physical and chemical driving forces, the stable aerosol droplets 13 and the component 12 in the fluid 10 attract to each other through a chemical or physical interaction to form a plurality of rich droplets 14 that are also a stable aerosol droplets 14.

The fluid 10 containing the stable microdispersed droplets 14 is then directed to a microstructured extractor such as a porous medium 15. The porous medium 15 has an extended surface area for fluid to flow therethrough. Porous medium 15 can have various shapes and sizes, such as for example a cylinder or frustum configuration. The porous medium 15 may also comprise a single sheet that is pleated to provide an extended surface area for separation or multiple sheets of porous medium sandwiched together to form an asymmetric-shaped medium having pore size distributions and interfacial energy properties varying in the direction of flow.

One of the characteristics of the porous medium 15 used in the present invention is that the porous medium 15 has an appropriate chemical compatibility with the fluid 10 and the extraction liquid such as water, while having the capability to capture and coalesce the plurality of rich droplets 14 into a plurality of larger rich droplets 16 (shown in FIG. 1). As the droplets are being captured and grown, the film on the fibers act to greatly increase the specific surface area for mass transfer between the fluid 10 and liquid. The fibers are such that they then release the plurality of larger rich droplets when they are grown to a size that can be gravitationally separated from the fluid.

Porous medium 15 can be configured horizontally such that the plurality of larger rich droplets 16 and the fluid 10 exits the porous medium in a direction that is perpendicular to the direction in which the extracting fluid 11 and fluid 10 was initially introduced into the medium 15. Conversely, the porous medium 15 can also be configured vertically such that the plurality of larger rich droplets 16 and the fluid 10 exits the porous medium in a direction that is parallel to the direction in which the fluid 10 was initially introduced into the porous medium 15.

Figure 2:
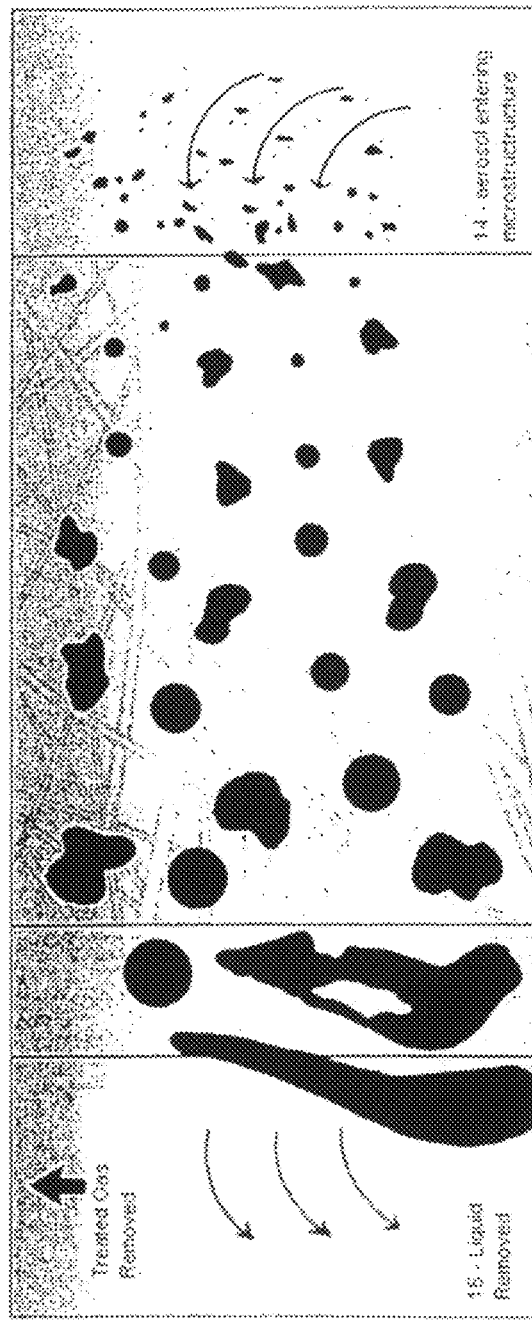
Figure 3:
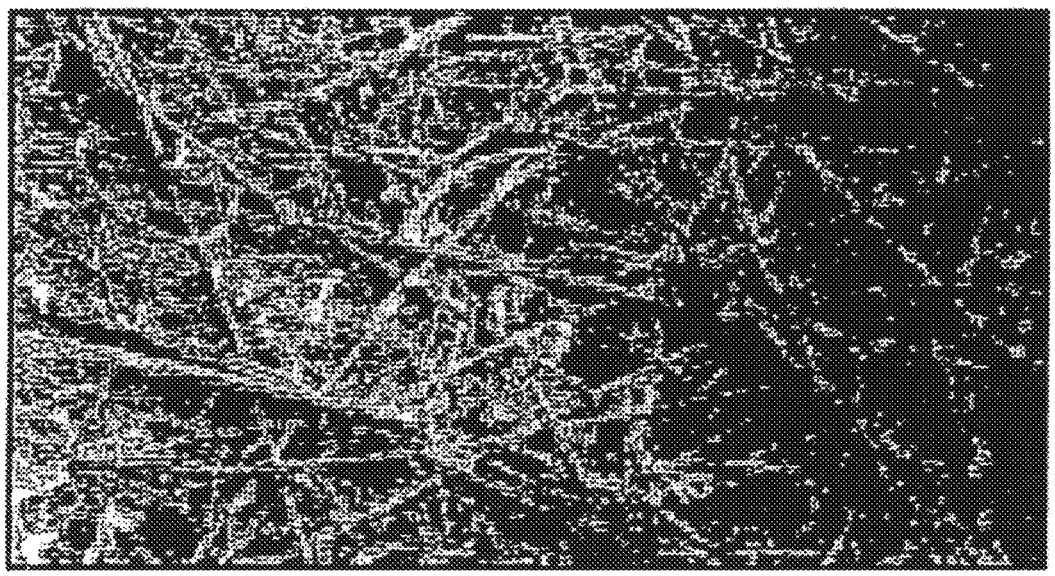

As shown in FIG. 1 and more clearly shown in FIG. 2, once the stable microdispersion of rich droplets 14 reach the porous medium 15, the stable microdispersion of rich droplets 14 are captured in the porous medium 15, and coalesce in the porous medium 15 to form the plurality of larger rich droplets 16. One of the characteristics of the larger rich droplets 16 is that the larger rich droplets 16 have been grown to a size that can be gravitationally separated from the fluid.

Once the larger rich droplets 16 are formed to a separable size on the porous medium 15, the larger rich droplets 16 separate from the porous medium 15 and gravitationally settle in a phase separate from the fluid (not shown). After the larger rich droplets 16 have settled (not shown), the larger rich droplets 16 can then be removed from the fluid 10 by various conventional means such as through a liquid level control device.

FIG. 2 is a close-up view of the porous medium 15 of FIG. 1 showing the manner in which the porous medium 15 coalesces the stable aerosol of rich droplets 14 into larger sized rich droplets 16 of sufficient size to gravitationally settle in the fluid 10. The film formed on the fibers as the droplets are captured serves to enhance the mass-transfer efficiency.

The porous medium 15 used in the present invention can be made from both an inorganic material and/or an organic material. Examples of suitable inorganic materials include but are not limited to glass of various types, inorganic polymers and ceramic. Examples of suitable organic materials include but are not limited to polyolefins, polyphenylene sulfides, polyimides, polycarbonates, poly aramids, polyesters, polbyamides, fluorinated polymers, Teflon, polyorganosilanes, polyacrylates, polysulfones, cellulose acetates, cellulosic materials (of natural or synthetic origin), and cotton. These materials may be utilized with or without binders that are designed to maintain structural integrity as well as modify interfacial properties.

Shown in FIG. 2, as the fluid 10 passes through the porous medium 15, the stable microdispersion of rich droplets 14 are captured. As more stable microdispersion of rich droplets 14 are captured, the captured rich droplets 14 coalesce to form the larger rich droplets 16. Once the larger rich droplets 16 have grown to a gravitationally separable size, they are pulled away from the porous medium 15 by the fluid 10 that is moving through the porous medium 15.

In connection with the present process, although not required, it is preferable to filter the incoming fluid 10 to prevent the plugging and destruction of the porous medium 15 by particulate matter entrained in the fluid. Plugging of the porous medium 15 by particulates causes the undesirable effect of an increase in the pressure drop across the system. It is preferred that the limiting pressure drop across the porous medium to be less than 20 psi, preferably under 10 psi.

Figure 4:
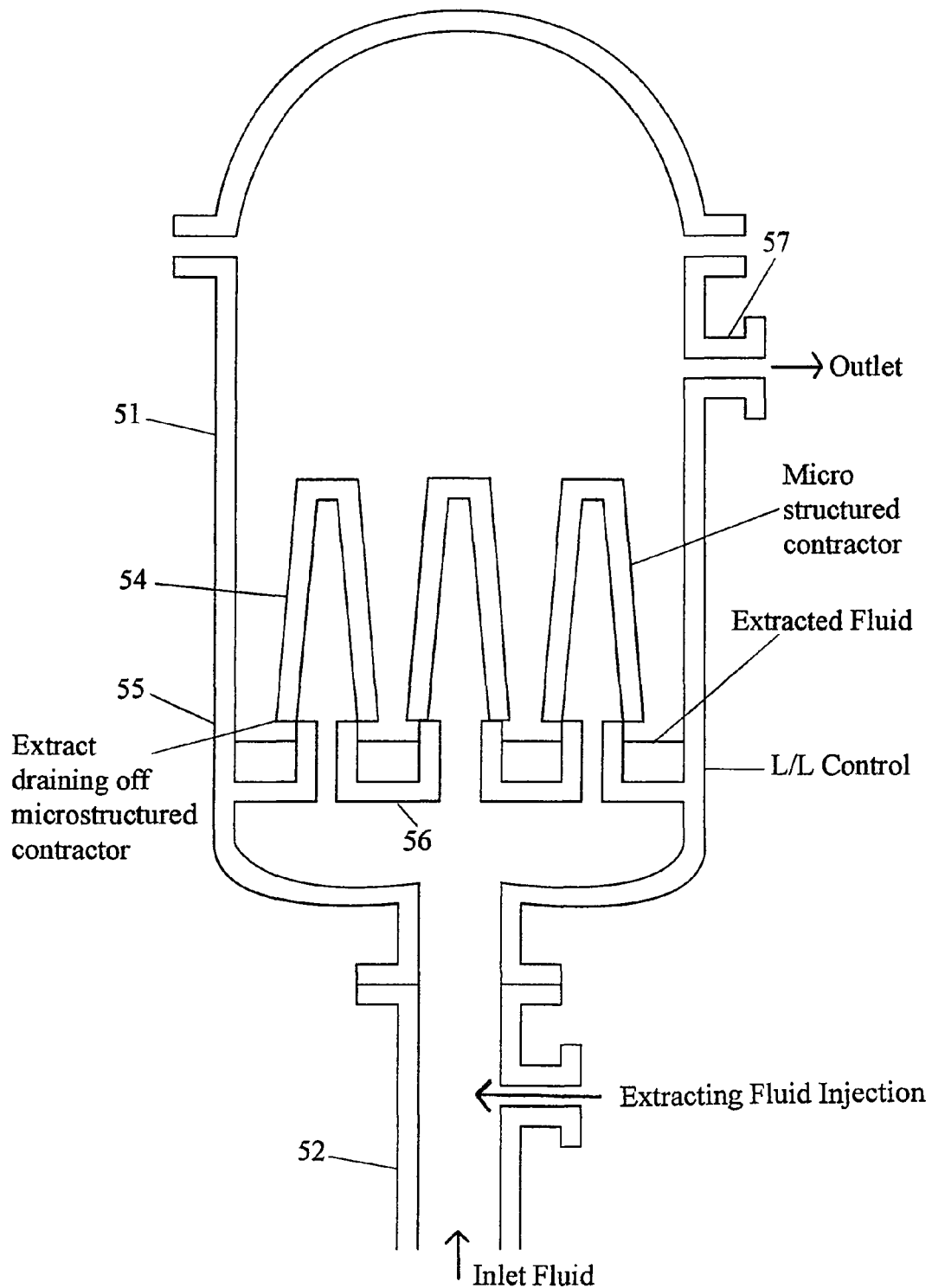

As noted above FIG. 4 is a schematic of a process whereby heavy hydrocarbons are being removed from a gas stream with an extracting fluid such as an oil, and the extracting fluid being subsequently regenerated. There is a vessel 51 that may have at its base an inlet 52 for receiving an inlet fluid such as a gas stream. The gas stream is preferably in the form of a vapor. Downstream from the inlet but before the vessel there is a second inlet 53 for injecting an extracting fluid such as an oil. The extracting fluid is preferably in an aerosolized form. The stream enters into the vessel 51 whereupon it is directed to a microstructured extractor such as a porous medium 54. Once the stable aerosol of rich droplets reach the porous medium 54, the stable aerosol of rich droplets are captured in the porous medium 54, and coalesce in the porous medium 54 to form the plurality of larger rich droplets. See FIG. 2. The larger rich droplets can be gravitationally separated from the fluid. Gravitation causes the larger droplets to flow to the base 55 of the microstructured extractor where the droplets can be collected by any suitable means such as but not limited to a plurality of receptacles 56. The extracted droplets can drained from the receptacles. The remaining fluid may be removed from the vessel through outlet 57.

Figure 5:
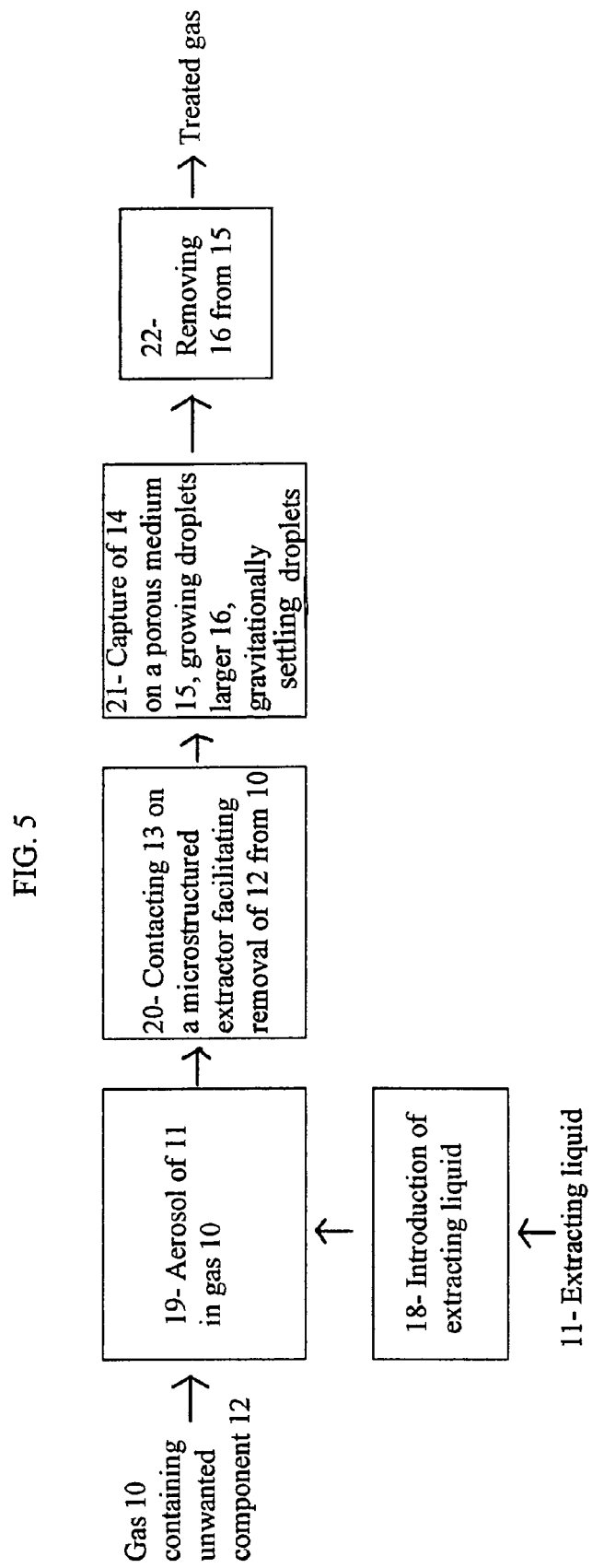

FIG. 5 is a block diagram view outline a process of acid, base or soluble, polar salt extraction. More specifically, the process of acid, base or salt removal as shown in FIG. 5 comprises the steps of the: (18) introducing a small volume of water or other neutralizing fluid 11 into the fluid 10 containing an acid, base or soluble, polar salt; (19) forming a plurality of water droplets in the fluid 10 to create a stable physical emulsion with the water droplets 13 having a size that is sufficiently small so that the droplets will not gravitationally settle, the plurality of water droplets 13 attractable to the material to be extracted through a hydrophilic interaction to form a.plurality of water-acid or water-base, or water-salt droplets 14; (20) directing the fluid containing the plurality of droplets 14 to a microstructured extractor comprising a porous medium 15 in which the porous medium 15 comprises an extended surface area design in an frustum or conical configuration; (21) capturing the plurality of droplets 14 in the porous medium 15; contacting the fluid 10 with the film of liquid on the porous medium 15; growing the liquid into a plurality of larger water-acid or water-base droplets 16, allowing the plurality of larger droplets 16 to gravitationally separate from the fluid; (22) and (23) separating the larger droplets 16 from the fluid to thereby remove the acid, base or soluble, polar salt 12 from the fluid 10.

Thus the present process comprises a process for the extraction of an unwanted liquid from a fluid by introducing an extraction liquid into a fluid having an unwanted liquid therein to form a physical aerosol comprised of a plurality of extraction liquid droplets and the fluid. A plurality of extraction liquid droplets interact hydrophilically, or oleophilically with the unwanted liquid in the fluid to cause the extraction liquid droplets to form into a plurality of droplets containing the extracted phase. Next, the mass transfer efficiency is enhanced by directing these dispersed droplets into a microdispersed extractor, where the droplets are captured by fibers on which the droplets form a film. The passage of the fluid through the fiber increases the surface area for mass transfer and enables the droplets to be grown and form larger droplets containing the unwanted liquid. At this point the larger droplets containing the unwanted liquid can be separated from the fluid.

While the process has been described using water as an extract liquid, other liquids could be used that exhibit a polar attraction for an acid, base or soluble, polar salt. It may be desired to use a buffer solution instead of the water. Similarly, the process can be implemented using a hydrocarbon oil to extract heavy hydrocarbon vapors from a gas stream. Similarly, the process can be implemented to extract oxygen from a gas stream.

Also, note that the process may involve the use of a heat exchanger to cool the gas down, thereby condensing the acid or hydrocarbon into an aerosol. The process may also involve the use of an extracting solvent to simultaneously cool the gas by the vaporization of the extracting liquid, and the extraction of the undesirable component into the remaining extracting liquid phase.

We claim:

1. A process for the extraction of an unwanted component from a fluid (liquid or gas) comprising: introducing an extraction liquid into a fluid having an unwanted component therein to form a physical microdispersion comprising a plurality of extraction liquid droplets and the fluid, said unwanted component selected from the group consisting of an acid, a base, and a polar salt; allowing the plurality of extraction liquid droplets to interact with the unwanted component in the fluid to cause the extraction liquid droplets to form into a plurality of aerosolized droplets containing the unwanted component, said plurality of aerosolized droplets including small droplets containing the unwanted component in the range of 0.1 to 1 microns; capturing the aerosolized droplets by movement into a porous medium wherein said porous medium is comprised of fibers with dimensions similar to that of said aerosolized droplets at least one of the dimensions of the fibers in said porous medium being in the 0.5 to 2.0 micron range and said fibers of said porous medium being wet out by said captured droplets to allow said captured droplets to interact with the unwanted component in the fluid to further extract the unwanted component from the fluid into said captured droplets;

growing said captured droplets into larger droplets containing the unwanted component;

gravitationally separating the larger droplets containing the unwanted component from the fluid by the time the fluid reaches the outside of the porous medium, said extraction and removal of said unwanted component being accomplished in a single stage, and orientating the porous medium horizontally such that the larger droplets and the fluid exits the porous medium in a direction that is substantially perpendicular to a direction in which the volume of extraction liquid was initially introduced.

2. The process of claim 1 wherein the step of introducing an extraction liquid into a gas having an unwanted component comprises introducing an extraction liquid into a vent gas stream having an unwanted base.

3. The process of claim 1 wherein the step of introducing an extraction liquid into a gas having an unwanted component comprises introducing an extraction liquid into a vent gas stream having an unwanted acid.

4. The process of claim 1 wherein the step of introducing an extraction liquid into a gas having an unwanted component comprises introducing an extraction liquid into a vent gas stream having an unwanted salt.

5. The process of claim 1 wherein the step of introducing an extraction liquid into a gas having a base comprises introducing aerosolized water droplets into a gas having a base containing gas.

6. The process of claim 1 wherein the step of introducing an extraction liquid into a gas having a polar salt comprises introducing aerosolized water droplets into a salt containing gas.

7. The process of claim 1 wherein the step of introducing an extraction liquid into a gas having a base gas comprises introducing aerosolized acidic droplets into a gas having a base gas.

8. The process of claim 1 wherein the step of introducing an extraction liquid into a gas having an acid gas comprises introducing aerosolized basic droplets into a gas having an acid gas.

9. The process of claim 1 wherein the step of introducing an extraction liquid into a gas having a base gas comprises introducing aerosolized buffer droplets into a gas having a base gas.

10. The process of claim 1 wherein the step of introducing an extraction liquid into a gas having an acid gas comprises introducing aerosolized buffer droplets into a gas having an acid gas.

11. The process of claim 1 wherein the step of introducing an extraction liquid into a gas having a polar salt comprises introducing aerosolized buffer droplets into a gas having a polar salt gas.

12. The process of claim 1 wherein said fibers of said porous medium have an affinity for said extraction liquid when said fibers are wetted out.

13. The process of claim 1 wherein the porous medium is constructed into a frustum wherein the aerosolized stream flows from the inside to the outside.

14. The process of claim 1 wherein the base is a sodium hydroxide or an amine vapor.

15. The process of claim 1 wherein the polar salt is a sodium, potassium or ammonium salt.

16. The process of claim 1 wherein the acid is hydrochloric acid.

17. The process of claim 1 wherein said porous medium is a single sheet that is pleated.

18. The process of claim 1 wherein said porous medium comprises multiple sheets sandwiched together.

19. The process of claim 1 wherein the step of introducing an extraction liquid into a gas having an acid gas comprises introducing aerosolized water droplets into an acid containing gas.

20. A process for the extraction of a polar salt from a fluid comprising the steps of: introducing a volume of polar liquid into a fluid containing a polar salt; forming a stable physical microdispersion comprising a plurality of microdispersed polar liquid droplets dispersed through out the fluid, said microdispersed polar liquid droplets attractable to the polar salt in the fluid through a polar interaction to form a plurality of aerosolized droplets containing the polar salt, said plurality of aerosolized droplets containing the polar salt including small droplets containing the polar salt in the range of 0.1 to 1 microns; capturing the aerosolized droplets by movement into a porous medium wherein said porous medium is comprised of fibers with dimensions similar to that of said aerosolized droplets at least one of the dimensions of said fibers of said porous medium being in the 0.5 to 2.0 micron range, wherein said porous medium has a specific surface area greater than 3,000 m2/m3, and wherein said fibers of said porous medium being wet out by said captured droplets to allow the captured droplets to interact with the polar salt in the fluid to further extract the polar salt from the fluid into the captured droplets; growing the captured droplets into a plurality of larger droplets containing the polar salt; gravitationally separating the larger droplets containing the polar salt from the fluid by the time the fluid reaches the outside of the porous medium, wherein said extraction and removal of said polar salt is accomplished in a single stage, orientating the porous medium horizontally such that the larger droplets and the fluid exits the porous medium in a direction that is substantially perpendicular to a direction in which the volume of polar liquid was initially introduced.

21. The process of claim 20 wherein the step of forming a stable physical aerosol comprising a plurality of aerosolized polar liquid droplets dispersed through out the gas comprises forming a stable physical aerosol comprising a plurality of polar liquid droplets under 1 micron in diameter dispersed through out the gas.

22. The process of claim 20 wherein the step of introducing an extraction liquid into a gas having a polar salt comprises introducing water into a vent gas stream having an unwanted polar salt gas.

23. The process of claim 20 wherein the porous medium is constructed into a frustum, wherein the aerosolized stream flows from the inside to the outside.

24. The process according to claim 20, where the polar salt is a sodium, potassium or ammonium salt.

25. The process of claim 20 wherein said porous medium is a single sheet that is pleated.

26. The process of 20 wherein said porous medium comprises multiple sheets sandwiched together.

27. The process of claim 20 wherein said fibers of said porous medium have an affinity for said extraction liquid when said fibers are wetted out.

28. A process for the extraction of an unwanted component from a fluid (liquid or gas) comprising: introducing an extraction liquid into a fluid having an unwanted component therein to form a physical microdispersion comprising a plurality of extraction liquid droplets and the fluid; allowing the plurality of extraction liquid droplets to interact with the unwanted component in the fluid to cause the extraction liquid droplets to form into a plurality of aerosolized droplets containing the unwanted component; capturing the aerosolized droplets by movement into a porous medium wherein said porous medium is comprised of fibers with dimensions similar to that of said aerosolized droplets, the dimensions of the fibers in said porous medium being in the 0.5 to 2.0 micron range, said porous medium being constructed without binders for maintaining structural integrity, and said fibers of said porous medium being wet out by said captured droplets to allow said captured droplets to interact with the unwanted component in the fluid to further extract the unwanted component from the fluid into said captured droplets; growing said captured droplets into larger droplets containing the unwanted component; and gravitationally separating the larger droplets containing the unwanted component from the fluid by the time the fluid reaches the outside of the porous medium.

29. The process of claim 28 including the step of orientating the porous medium horizontally such that the larger droplets and the fluid exits the porous medium in a direction that is substantially perpendicular to a direction in which the volume of extraction liquid was initially introduced.

30. The process of claim 28 wherein the porous medium is constructed into a frustum, wherein the aerosolized stream flows from the inside to the outside.

31. The process of claim 28 wherein said fibers of said porous medium have an affinity for said extraction liquid when said fibers are wetted out.

32. The process of claim 28 wherein said unwanted component is an acid, base, or polar salt.

33. The process of claim 32 wherein the base is a sodium hydroxide or an amine vapor.

34. The process of claim 32 wherein the polar salt is a sodium, potassium or ammonium salt.

35. The process of claim 32 wherein the acid is hydrochloric acid.

36. The process of claim 28 wherein the fluid having the unwanted component is filtered before reaching the extraction liquid.

* * * * *